(12) United States Patent
Shin et al.

(10) Patent No.: US 12,482,917 B2
(45) Date of Patent: Nov. 25, 2025

(54) ELECTRONIC DEVICE COMPRISING ANTENNA

(71) Applicant: Samsung Electronics Co., Ltd., Suwon-si (KR)

(72) Inventors: Dongryul Shin, Suwon-si (KR); Seokwoo Lee, Suwon-si (KR); Jiwoo Lee, Suwon-si (KR); Kyungbin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 18/606,409

(22) Filed: Mar. 15, 2024

(65) Prior Publication Data

US 2024/0250406 A1     Jul. 25, 2024

Related U.S. Application Data

(63) Continuation of application No. PCT/KR2022/009374, filed on Jun. 30, 2022.

(30) Foreign Application Priority Data

Sep. 16, 2021     (KR) .................... 10-2021-0123989

(51) Int. Cl.
    *H01Q 1/22*           (2006.01)
    *G06F 3/044*          (2006.01)
    *G06F 3/0354*        (2013.01)

(52) U.S. Cl.
    CPC .............. *H01Q 1/22* (2013.01); *G06F 3/044* (2013.01); *G06F 3/03547* (2013.01)

(58) Field of Classification Search
    CPC ........ H01Q 1/22; H01Q 1/2266; H01Q 21/08; H01Q 1/2283; G06F 3/044; G06F 3/03547; G06F 1/1698; G06F 1/16
    See application file for complete search history.

(56) References Cited

U.S. PATENT DOCUMENTS

| | | |
|---|---|---|
| 8,647,519 B1 | 2/2014 | Lin |
| 8,982,001 B2 | 3/2015 | Taniguchi et al. |
| | (Continued) | |

FOREIGN PATENT DOCUMENTS

| | | |
|---|---|---|
| EP | 3114728 B1 | 6/2021 |
| JP | 2011-002950 A | 1/2011 |
| | (Continued) | |

OTHER PUBLICATIONS

International Search Report dated Oct. 14, 2022, issued in International Patent Application No. PCT/KR2022/009374.

(Continued)

*Primary Examiner* — David E Lotter
(74) *Attorney, Agent, or Firm* — Jefferson IP Law, LLP

(57) ABSTRACT

An electronic device is provided. The electronic device includes a housing which forms at least a part of an exterior of the electronic device, an antenna module which is disposed in the housing and includes a first surface facing one surface of the housing and a second surface facing the opposite direction of the first surface, the antenna module including an antenna array disposed on the first surface, a wireless communication circuit electrically connected with the antenna module, an insulation layer which is disposed between the first surface of the antenna module and one surface of the housing, and first pads which are disposed in a first area of the insulation layer that corresponds to the first surface of the antenna module, wherein each of the first pads has a first shape in which at least a part of an area overlapping the antenna array is removed, and wherein the wireless communication circuit feeds power to the antenna array, thereby transmitting and/or receiving a signal of a designated frequency band.

20 Claims, 17 Drawing Sheets

(56) References Cited

U.S. PATENT DOCUMENTS

| | | | |
|---|---|---|---|
| 8,985,466 B2 | 3/2015 | Wu et al. | |
| 2014/0335785 A1* | 11/2014 | Kato | H01Q 1/2266 455/41.1 |
| 2015/0255856 A1 | 9/2015 | Hong et al. | |
| 2017/0133743 A1 | 5/2017 | Kato et al. | |
| 2017/0139520 A1 | 5/2017 | Yeh et al. | |
| 2020/0209995 A1 | 7/2020 | So et al. | |
| 2021/0181871 A1 | 6/2021 | Bertrand | |
| 2022/0027013 A1* | 1/2022 | Kim | G06F 1/1643 |
| 2022/0037763 A1 | 2/2022 | Kim et al. | |
| 2022/0263237 A1 | 8/2022 | Choi et al. | |

FOREIGN PATENT DOCUMENTS

| | | |
|---|---|---|
| JP | 5118666 B2 | 1/2013 |
| JP | 2018-194987 A | 12/2018 |
| KR | 10-2016-0051136 A | 5/2016 |
| KR | 10-2020-0117482 A | 10/2020 |
| KR | 10-2225524 B1 | 3/2021 |
| KR | 10-2248849 B2 | 5/2021 |
| KR | 10-2580708 B1 | 9/2023 |

OTHER PUBLICATIONS

Extended European Search Report dated Nov. 15, 2024, issued in European Patent Application No. 22870103.3.

* cited by examiner

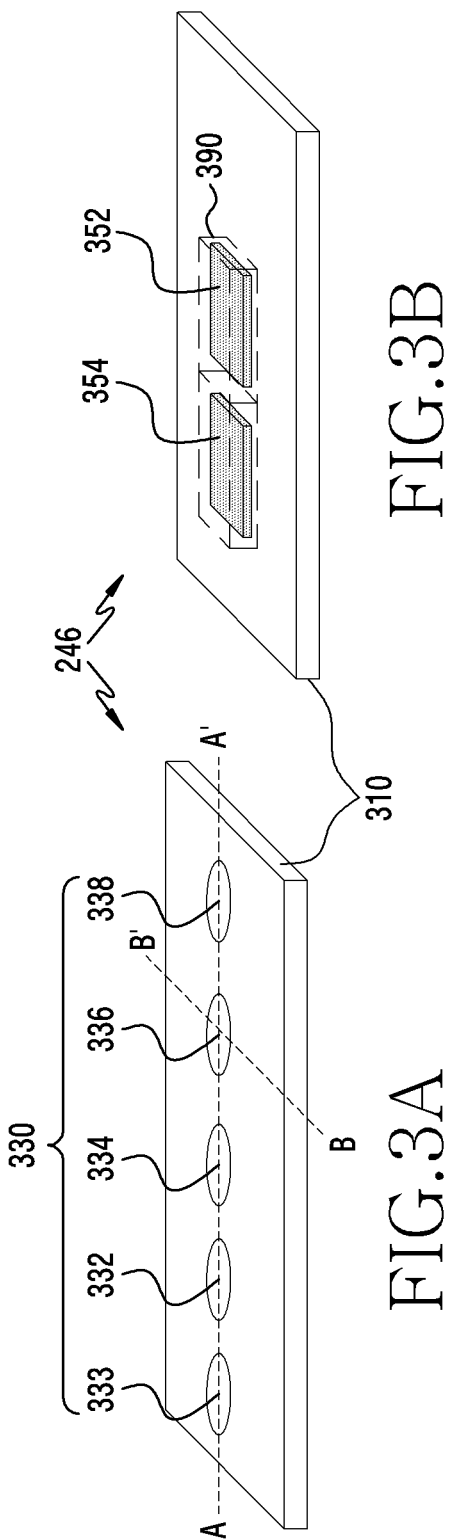
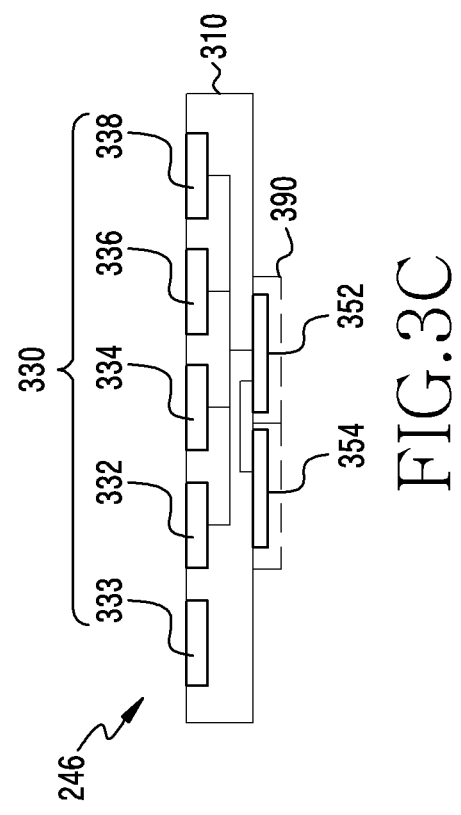

ELECTRONIC DEVICE COMPRISING ANTENNA

CROSS-REFERENCE TO RELATED APPLICATION(S)

This application is a continuation application, claiming priority under § 365(c), of an International application No. PCT/KR2022/009374, filed on Jun. 30, 2022, which is based on and claims the benefit of a Korean patent application number 10-2021-0123989, filed on Sep. 16, 2021, in the Korean Intellectual Property Office, the disclosure of which is incorporated by reference herein in its entirety.

BACKGROUND

1. Field

The disclosure relates to an electronic device including an antenna.

2. Description of Related Art

Thanks to the development of communication devices, electronic devices (for example, laptops) may include antenna modules capable of fast, high-capacity transmission to produce and transmit various contents, connect various objects to the Internet (for example, Internet of things (IoT)), or connect communication among various sensors for autonomous driving. For example, an electronic device may include an antenna module (hereinafter, a millimeter wave (mmWave) antenna module) to emit mmWave signals.

When metal exists in an area where an antenna module emits signals in disposing such an antenna module in an electronic device, the metal may be removed and may be replaced with a nonconductive material. In particular, in an electronic device including a touch pad like a laptop, an mmWave antenna module may be disposed in a touch pad area.

The above information is presented as background information only to assist with an understanding of the disclosure. No determination has been made, and no assertion is made, as to whether any of the above might be applicable as prior art with regard to the disclosure.

SUMMARY

When a housing of a metallic material exists in an area where an antenna module emits radio frequency (RF) signals in disposing the antenna module supporting mmWave bands in an electronic device, radiation performance of an antenna may be degraded.

In addition, when at least a part of the area where the antenna module emits RF signals is replaced with a non-conductive material, an aesthetic feature may be degraded due to the removal of metal of the exterior and mechanical rigidity be reduced.

In some embodiments of the disclosure, a structure of a part of an area of a touch pad where an antenna module is disposed may be changed to a structure for guaranteeing an antenna radiation path.

Aspects of the disclosure are to address at least the above-mentioned problems and/or disadvantages and to provide at least the advantages described below. Accordingly, an aspect of the disclosure is to provide an electronic device including an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing which forms at least a part of an exterior of the electronic device, an antenna module which is disposed in the housing and includes a first surface facing one surface of the housing and a second surface facing in the opposite direction of the first surface, the antenna module including an antenna array disposed on the first surface, a wireless communication circuit electrically connected with the antenna module, an insulation layer which is disposed between the first surface of the antenna module and one surface of the housing, and first pads which are disposed in a first area of the insulation layer that corresponds to the first surface of the antenna module, wherein each of the first pads has a first shape in which at least a part of an area overlapping the antenna array is removed, and wherein the wireless communication circuit feeds power to the antenna array, thereby transmitting and/or receiving a signal of a designated frequency band.

In accordance with another aspect of the disclosure, an electronic device is provided. The electronic device includes a display, a housing including a first housing coupled with the display, and a second housing coupled to be rotatable relative to the first housing through the hinge structure and including a cover layer, an antenna module which is disposed in the second housing and includes a first surface facing the cover layer and a second surface facing in the opposite direction of the first surface, the antenna module including an antenna array disposed on the first surface, a wireless communication circuit electrically connected with the antenna module, an insulation layer which is disposed between the first surface of the antenna module and the cover layer, and first pads which are disposed in a first area of the insulation layer that corresponds to the first surface of the antenna module, and each of the first pads has a first shape in which at least a part of an area overlapping the antenna array is removed, and the wireless communication circuit feeds power to the antenna array, thereby transmitting and/or receiving a signal of a designated frequency band.

According to various embodiments of the disclosure, at least a part of an area that corresponds to an area where an antenna module is disposed among areas of a touch pad has a specific shape, so that degradation of radiation performance of an antenna module may be reduced.

In addition, according to various embodiments, an antenna module is disposed in an area that is adjacent to a periphery among areas of a touch pad, so that reduction of usability of a touch pad may be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A, 3B, and 3C are views illustrating a structure of a third antenna module explained with reference to FIG. 2, according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
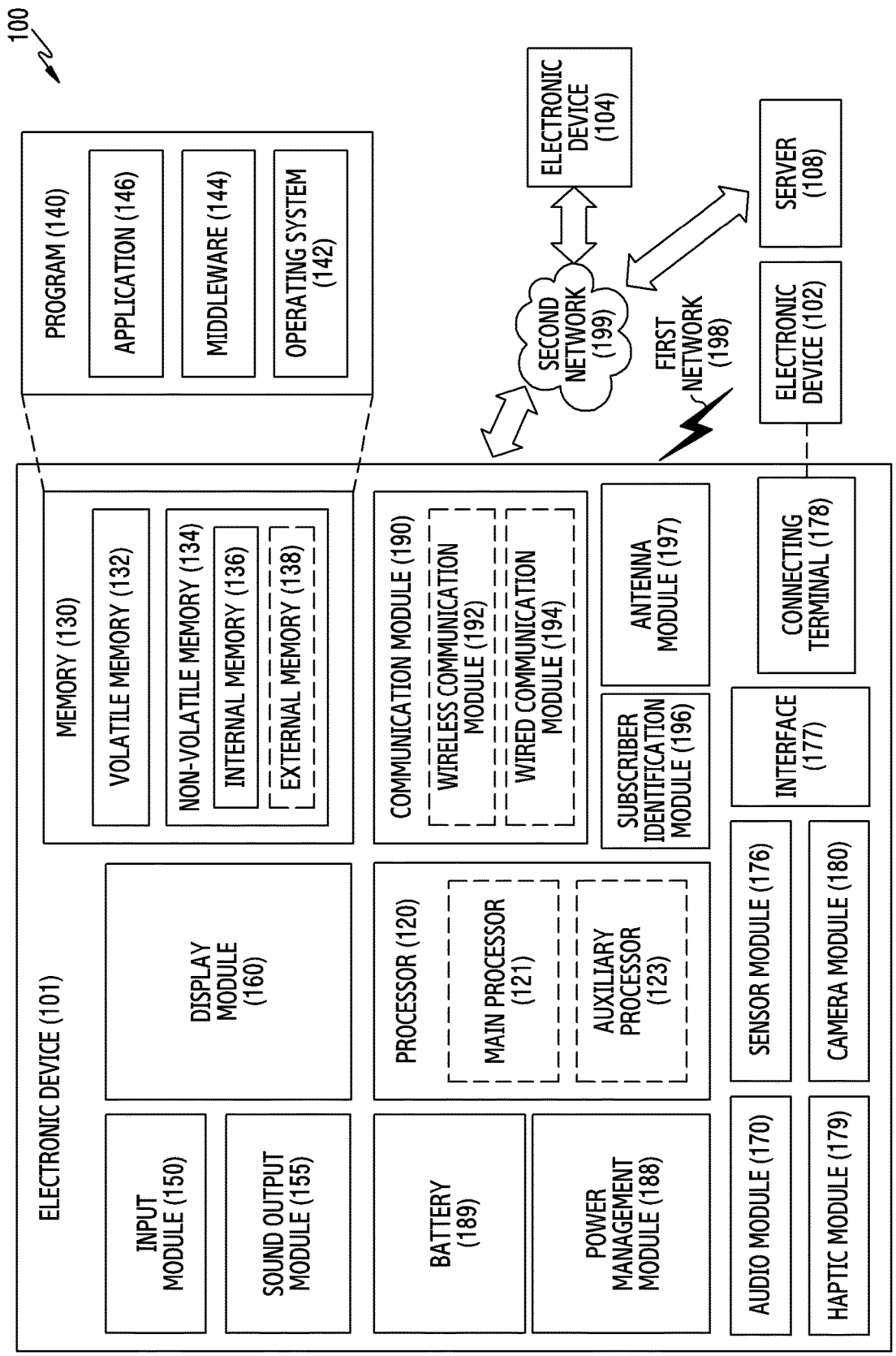
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may be configured to control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may for example, include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may be configured to receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. In another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may for example, identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may for example, perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that the various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to still other embodiments, operations performed by the module, the program, or another component may be carried out sequentially, in parallel, repeatedly, or heuristically, or one or more of the operations may be executed in a different order or omitted, or one or more other operations may be added.

Figure 2:
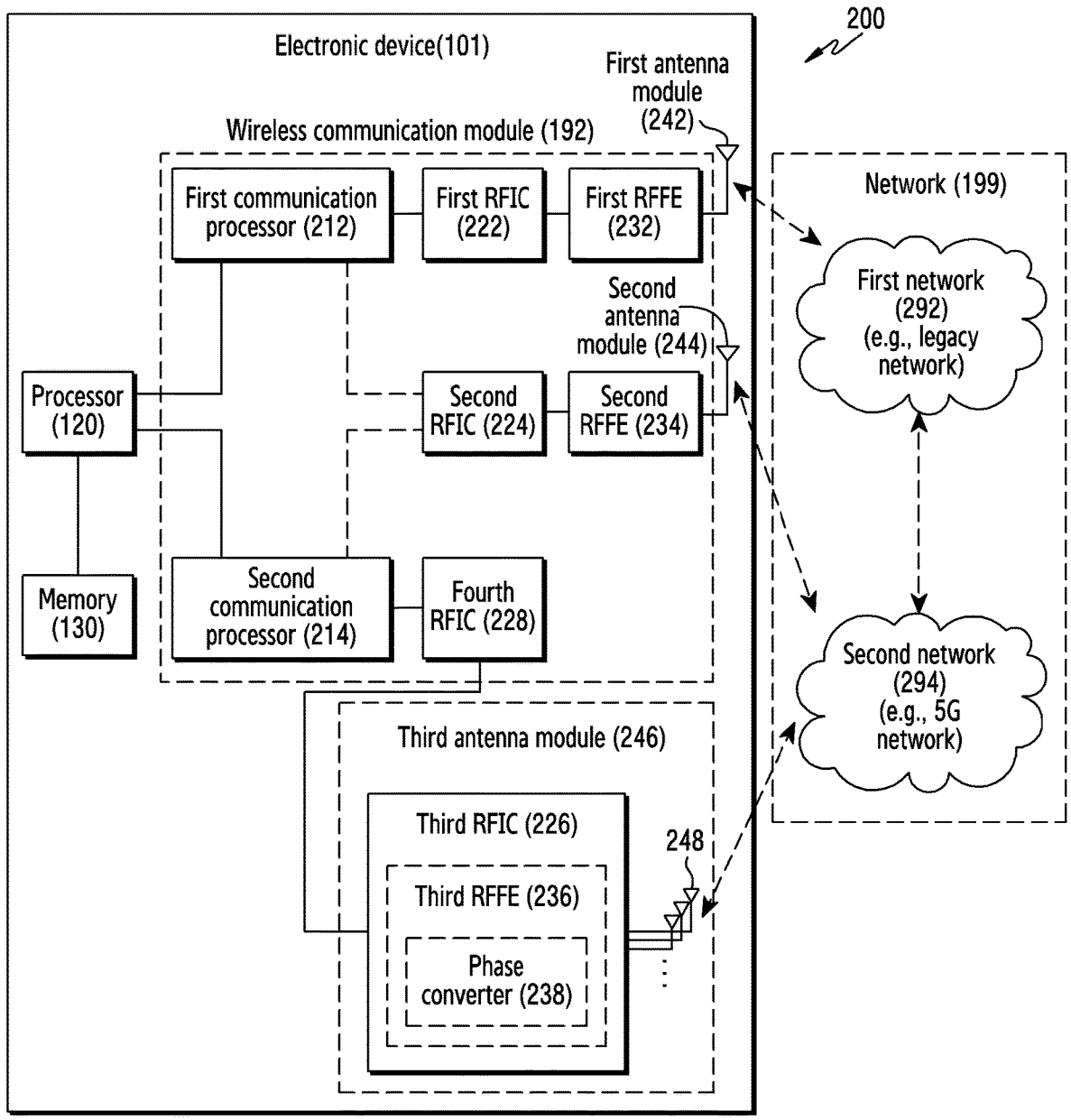
FIG. 2 is a block diagram of an electronic device for supporting legacy network communication and fifth generation (5G) network communication according to an embodiment of the disclosure.

FIG. 2 is a block diagram 200 of an electronic device 101 for supporting legacy network communication and 5G network communication according to an embodiment of the disclosure.

Referring to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to an embodiment, the electronic device 101 may further include at least one of the components illustrated in FIG. 1, and the network 199 may further include at least one other network. According to another embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or may be included as part of the third RFIC 226.

The first communication processor 212 may establish a communication channel of a band to be used for wireless communication with the first network 292, and may support legacy network communication via the established communication channel. According to various embodiments, the first network may be a legacy network including a second generation (2G), third generation (3G), 4G, or long term evolution (LTE) network. The second communication processor 214 may establish a communication channel corresponding to a designated band (for example, about 6 GHz to about 60 GHz) among bands to be used for wireless communication with the second network 294, and may support 5G network communication via the established communication channel. According to some embodiments, the second network 294 may be a 5G network which is defined in 3GPP. Additionally, according to an embodiment, the first communication processor 212 or the second communication processor 214 may establish a communication channel corresponding to another designated band (for example, about 6 GHz or lower) among the bands to be used for wireless communication with the second network 294, and may support 5G network communication via the established communication channel. According to another embodiment, the first communication processor 212 and the second communication processor 214 may be implemented within a single chip or a single package. According to various embodiments, the first communication processor 212 or the second communication processor 214 may be formed within a single chip or a single package, with the processor 120, the auxiliary processor 123, or the communication module 190.

When transmitting signals, the first RFIC 222 may convert a baseband signal, which is generated by the first communication processor 212, into a radio frequency (RF) signal of about 700 MHz to about 3 GHz to be used in the first network 292 (for example, a legacy network). When signals are received, an RF signal may be acquired from the first network 292 (for example, a legacy network) via an antenna (for example, the first antenna module 242), and may be pre-processed through an RFFE (for example, the first RFFE 232). The first RFIC 222 may for example, convert the pre-processed RF signal into a baseband signal to be processed by the first communication processor 212.

When transmitting signals, the second RFIC 224 may convert a baseband signal, which is generated by the first communication processor 212 or the second communication processor 214, into an RF signal (hereinafter, a 5G Sub6 RF signal) of a Sub6 band (for example, about 6 GHz or lower) to be used in the second network 294 (for example, a 5G network). When signals are received, a 5G Sub6 RF signal may be acquired from the second network 294 (for example, a 5G network) via an antenna (for example, the second antenna module 244), and may be pre-processed through an RFFE (for example, the second RFFE 234). The second RFIC 224 may for example, convert the pre-processed 5G Sub6 RF signal into a baseband signal to be processed by a corresponding communication processor among the first communication processor 212 or the second communication processor 214.

The third RFIC 226 may convert a baseband signal, which is generated by the second communication processor 214, into an RF signal (hereinafter, a 5G Above6 RF signal) of a 5G Above6 band (for example, about 6 GHz to about 60 GHz) to be used in the second network 294 (for example, a 5G network). When signals are received, a 5G Above6 RF signal may be acquired from the second network 294 (for example, a 5G network) via an antenna (for example, the antenna 248), and may be pre-processed through the third RFFE 236. The third RFIC 226 may convert the pre-processed 5G Above6 RF signal into a baseband signal to be processed by the second communication processor 214. According to one embodiment, the third RFFE 236 may be formed as part of the third RFIC 226.

In an embodiment, the electronic device 101 may include the fourth RFIC 228 separately from or as part of the third RFIC 226. In this case, the fourth RFIC 228 may convert a baseband signal, which is generated by the second communication processor 214, into an RF signal of an intermediate frequency (IF) band (for example, about 9 GHz to about 11 GHz) (hereinafter, an IF signal), and then may transfer the IF signal to the third RFIC 226. The third RFIC 226 may convert the IF signal into a 5G Above6 RF signal. When signals are received, a 5G Above6 RF signal may be received from the second network 294 (for example, a 5G network) via an antenna (for example, the antenna 248), and may be converted into an IF signal by the third RFIC 226. The fourth RFIC 228 may for example, convert the IF signal into a baseband signal to be processed by the second communication processor 214.

According to an embodiment, the first RFIC 222 and the second RFIC 224 may be implemented as part of a single chip or single package. According to another embodiment, the first RFFE 232 and the second RFFE 234 may be implemented as part of a single chip or a single package. According to an embodiment, at least one antenna module of the first antenna module 242 or the second antenna module 244 may be omitted, or may be coupled with another antenna module to process RF signals of a plurality of corresponding frequency bands.

In an embodiment, the third RFIC 226 and the antenna 248 may be disposed on the same substrate to form a third antenna module 246. For example, the wireless communication module 192 or the processor 120 may be disposed on a first substrate (for example, a main PCB). In this case, the third antenna module 246 may be formed by the third RFIC 226 being disposed on an area (for example, a lower surface) of a second substrate (for example, a sub PCB) separate from the first substrate, and the antenna 948 being disposed on another area (for example, an upper surface). The third RFIC 226 and the antenna 248 may be disposed on the same substrate, so that a length of a transmission line therebetween may be reduced. This may reduce a loss (for example, attenuation) of a signal of a high frequency band (for example, about 6 GHz to about 60 GHz) used for 5G network communication, which is caused by a transmission line. The electronic device 101 may enhance quality or speed of communication with the second network 294 (for example, the 5G network).

According to one embodiment, the antenna 248 may be formed as an antenna array including a plurality of antenna elements to be used for beamforming. In this case, the third RFIC 226 may include a plurality of phase shifters 238 corresponding to the plurality of antenna elements, as part of the third RFFE 236. When transmitting signals, the plurality of phase shifters 238 may shift phases of 5G Above6 RF signals to be transmitted to the outside (for example, a base station of a 5G network) of the electronic device 101 via corresponding antenna elements. When receiving signals, the plurality of phase shifters 238 may shift phases of 5G Above6 RF signals received from the outside through corresponding antenna elements to the same phases or substantially the same phases. This makes it possible to transmit or receive through beamforming between the electronic device 101 and the outside.

The second network 294 (for example, a 5G network) may be operated independently from the first network 292 (for example, a legacy network) (for example, stand-alone (SA)), or may be operated in conjunction therewith (for example, non-stand alone (NSA)). For example, the 5G network may include only an access network (for example, a 5G radio access network (RAN) or a next generation RAN (NG RAN)), and may not include a core network (for example, a next generation core (NGC)). In this case, after accessing the access network of the 5G network, the electronic device 101 may access an external network (for example, Internet) under control of the core network (for example, an evolved packed core (EPC)) of the legacy network. Protocol information (for example, LTE protocol information) for communication with the legacy network or protocol information (for example, new radio (NR) protocol information) for communication with the 5G network may be stored in the memory 230, and may be accessed by other components (for example, the processor 120, the first communication processor 212, or the second communication processor 214).

FIGS. 3A, 3B, and 3C illustrate a structure of the third antenna module 246 described with reference to FIG. 2 according to various embodiments of the disclosure. FIG. 3A is a perspective view of the third antenna module 246 as viewed from one side, and FIG. 3B is a perspective view of the third antenna module 246 as viewed from the other side. FIG. 3C is a cross-sectional view taken on line A-A', illustrating the third antenna module 246.

Referring to FIGS. 3A to 3C, in an embodiment, a third antenna module 246 may include a printed circuit board 310, an antenna array 330, a radio frequency integrate circuit (RFIC) 352, a power manage integrate circuit (PMIC) 354, and a module interface 370. Optionally, the third antenna module 246 may further include a shielding member 390. In other embodiments, at least one of the aforementioned components may be omitted or at least two of the aforementioned components may be integrated.

The printed circuit board 310 may include a plurality of conductive layers and a plurality of nonconductive layers which are stacked alternately with the conductive layers. The printed circuit board 310 may for example, provide electrical connection between the printed circuit board 310 and/or various electronic components disposed outside by using wires and conductive vias which are formed on the conductive layer.

The antenna array 330 (for example, 248 of FIG. 2) may include a plurality of antenna elements 332, 333, 334, 336, or 338 disposed to form a directional beam. The antenna elements may be formed on a first surface of the printed circuit board 310 as shown in the drawings. According to another embodiment, the antenna array 330 may be disposed inside the printed circuit board 310. According to various embodiments, the antenna array 330 may include a plurality of antenna arrays of the same or different shapes or kinds (for example, a dipole antenna array and/or a patch antenna array).

The RFIC 352 (for example, 226 of FIG. 2) may be disposed on another area (for example, a second surface opposite to the first surface) of the printed circuit board 310 that is spaced apart from the antenna array. The RFIC may be configured to process a signal of a selected frequency band which is transmitted/received through the antenna array 330. According to another embodiment, when transmitting signals, the RFIC 352 may convert a baseband signal acquired from a communication processor (not shown) into an RF signal of a designated band. When receiving signals, the RFIC 352 may convert an RF signal received through the antenna array 330 into a baseband signal, and may transmit the signal to the communication processor.

According to an embodiment, when transmitting signals, the RFIC 352 may up-convert an IF signal (for example, about 9 GHz to about 11 GHz) acquired from an intermediate frequency integrate circuit (IFIC) (for example, 228 of FIG. 2) into an RF signal of a selected band. When receiving signals, the RFIC 352 may down-convert an RF signal acquired through the antenna array 330 into an IF signal, and may transmit the signal to the IFIC.

The PMIC 354 may be disposed on a part of another area (for example, the second surface) of the printed circuit board 310, which is spaced apart from the antenna array. The PMIC may receive a voltage from a main PCB (not shown) and may provide necessary power to various components (for example, the RFIC 352) on the antenna module.

The shielding member 390 may be disposed on a part (for example, the second surface) of the printed circuit board 310 to electromagnetically shield at least one of the RFIC 352 or the PMIC 354. According to another embodiment, the shielding member 390 may include a shield can.

In some embodiments, the third antenna module 246 may be electrically connected with another printed circuit board (for example, a major circuit board) through the module interface although the module interface is not illustrated. The module interface may include a connection member, for example, a coaxial cable connector, a board-to-board connector, an interposer, or a flexible printed circuit board (FPCB). The RFIC 352 and/or the PMIC 354 of the antenna module may be electrically connected with the printed circuit board through the connection member.

Figure 4A:
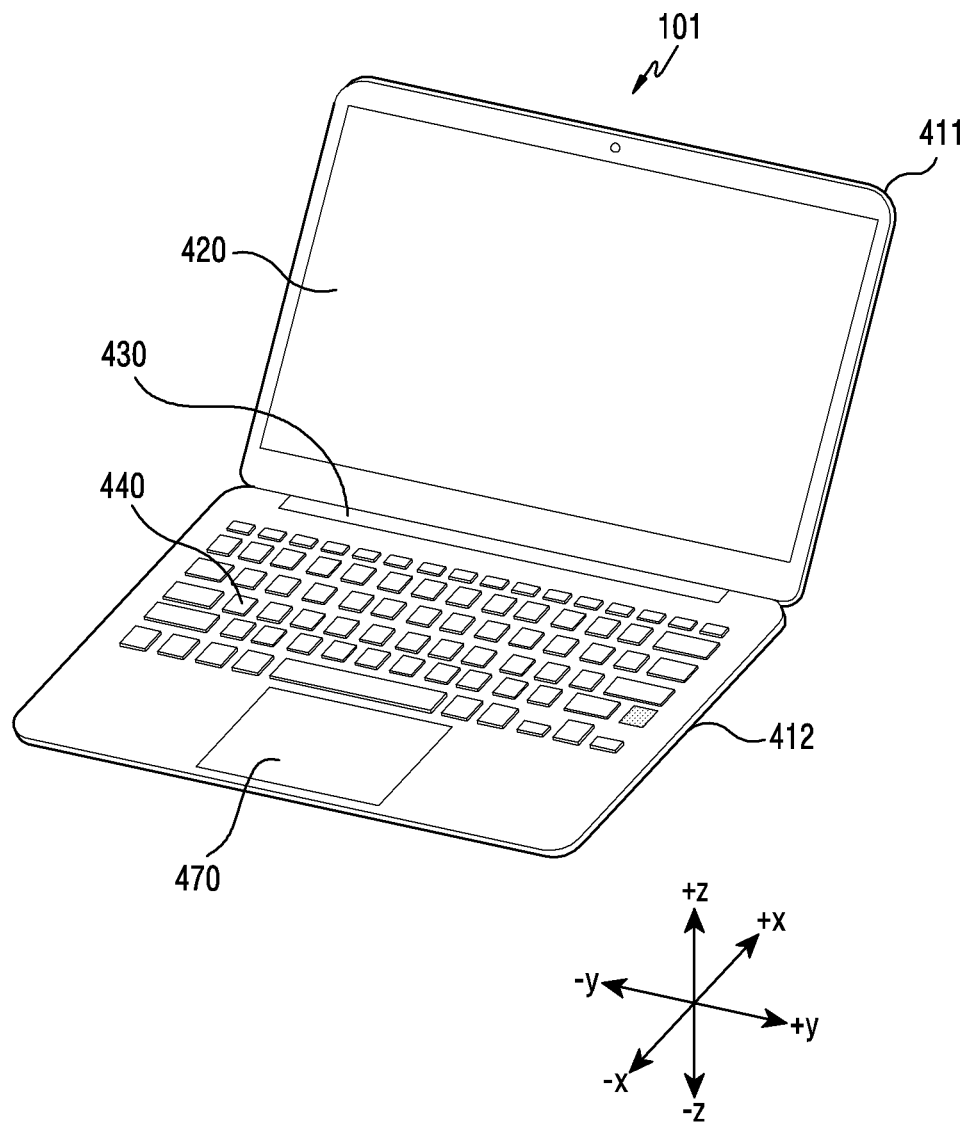
FIG. 4A is a view illustrating an unfolding state of an electronic device according to an embodiment of the disclosure.
Figure 4B:
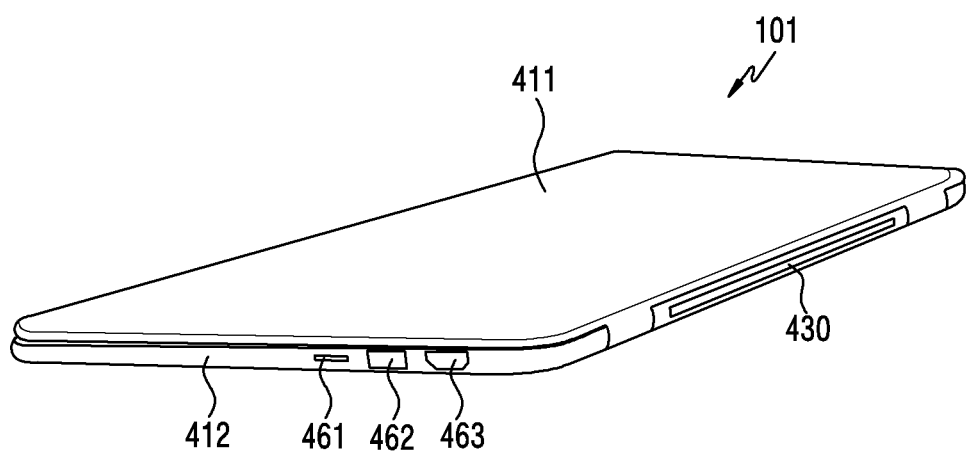
FIG. 4B is a view illustrating a folding state of an electronic device according to an embodiment of the disclosure.

FIG. 4A illustrates an unfolding state of an electronic device according to an embodiment of the disclosure. FIG. 4B illustrates a folding state of an electronic device according to an embodiment of the disclosure.

Referring to FIGS. 4A and 4B, an electronic device 101 according to an embodiment may include a first housing 411, a second housing 412, a display 420, a hinge structure 430, a keyboard 440 and/or a touch pad 470.

In an embodiment, the first housing 411 and/or the second housing 412 may form at least a part of the exterior of the electronic device 101. In an embodiment, at least a part of the first housing 411 and/or the second housing 412 may be formed by coated or colored glass, ceramic, a polymer, metal (for example, aluminum, stainless steel (STS), or magnesium), or a combination of at least two of the above-mentioned materials.

According to another embodiment, the second housing 412 may be connected to be rotatable relative to the first housing 411. For example, the first housing 411 and the second housing 412 may be connected through the hinge structure 430. In an example, the second housing 412 may rotate relative to the first housing 411 with reference to a first axis (for example, a y-axis). In yet another embodiment, the first housing 411 and the second housing 412 may be disposed on both sides with reference to the first axis (for example, the y-axis), and may be symmetric with reference to the first axis. However, the shapes of the first housing 411 and the second housing 412 may not be limited to the symmetric shape and at least a part of the first housing 411 and the second housing 412 may be asymmetrical with respect to the first axis.

According to an embodiment, the display 420 may be coupled to the first housing 411. The first housing 411 and the display 420 may be coupled to form a part of an inner space of the electronic device 101. In another embodiment, a plurality of electronic components (for example, a printed circuit board) may be disposed in the inner space of the electronic device 101. In yet another embodiment, the display 420 may be coupled with or may be disposed adjacent to a touch sensing circuit, a pressure sensor for measuring an intensity (pressure) of a touch, and/or a digitizer for detecting a stylus pen of a magnetic field method.

According to an embodiment, the keyboard 440 may be disposed on one surface of the second housing 412. In an embodiment, the touch pad 470 may be disposed on one surface of the second housing 412. According to another embodiment, the keyboard 440 and the touch pad 470 may be disposed on the same surface of the second housing 412. For example, the touch pad 470 may be positioned in a first direction (for example, a −x direction) relative to the keyboard 440. In an embodiment, the touch pad 470 may identify a touch input of a user by using a touch detection sensor coupled with the touch pad 470. In another example, when a part of user's body (for example, a finger) touches at least a part of the touch pad 470, a sensor of the touch pad 470 may identify a touch input of the user by detecting a change in the capacitance of the part touched by the part of user's body. This will be described below in detail.

Referring to FIG. 4B, the electronic device 101 according to an embodiment may include connector holes 461, 462, 463 formed in the second housing 412. The connector hole 461, 462 or 463, according to an embodiment, may include a first connector hole 461 to connect to a memory card, a second connector hole 462 to connect to a connector to exchange audio signals with an external electronic device, or a third connector hole 463 to connect to a connector (for example, a USB connector) to exchange power and/or data with an external electronic device. The positions or number of the connector holes are not limited to the example of FIG. 4B, and may vary.

Figure 5A:
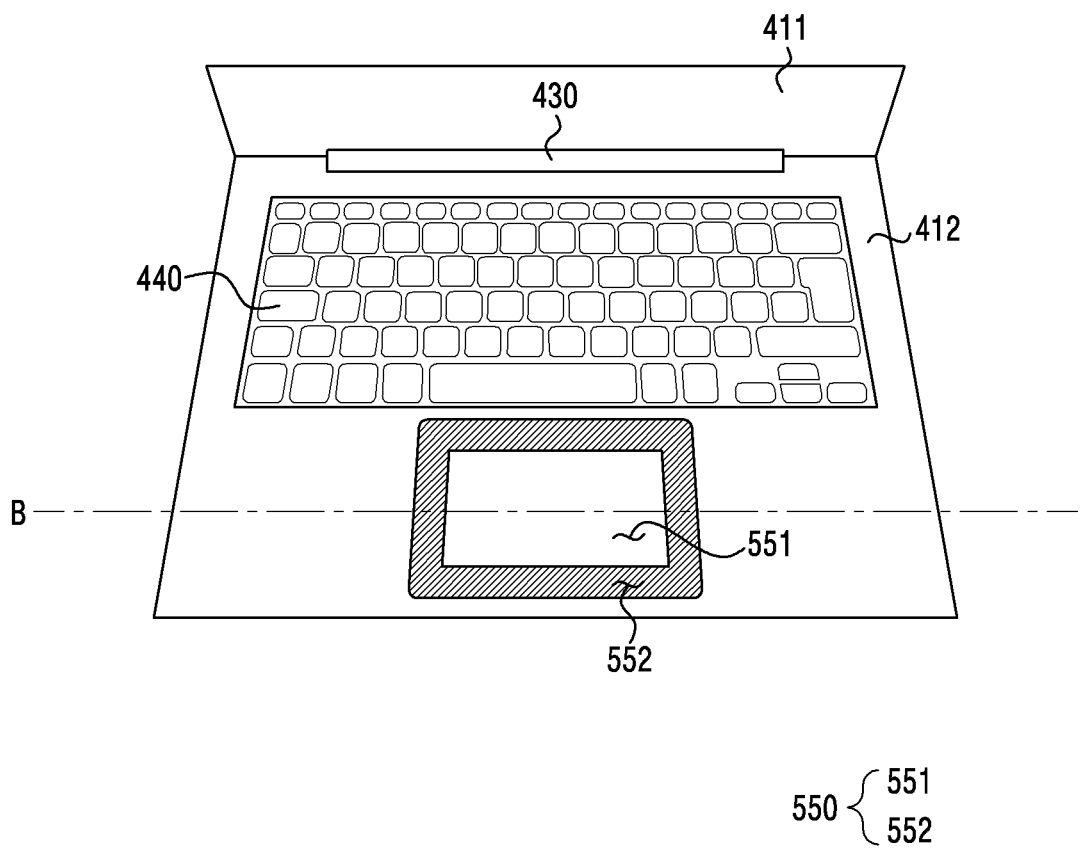
FIG. 5A is a view illustrating a part of an electronic device including a touch pad according to an embodiment of the disclosure.
Figure 5B:
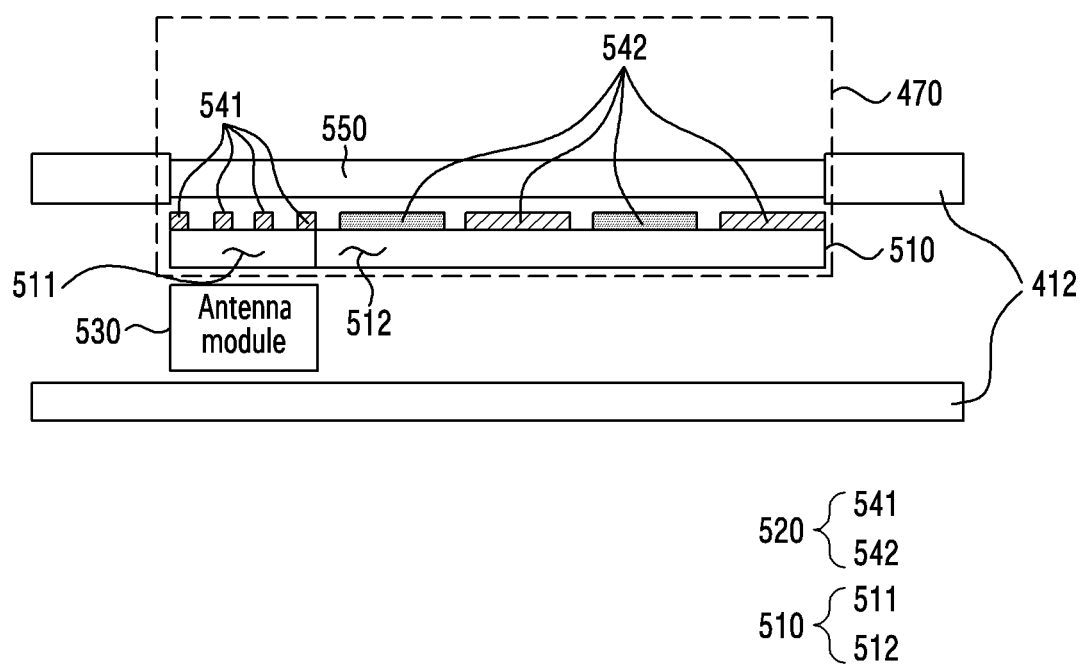
FIG. 5B is a view illustrating a cross-sectional view taken along a B axis of FIG. 5A according to an embodiment of the disclosure.
Figure 5C:
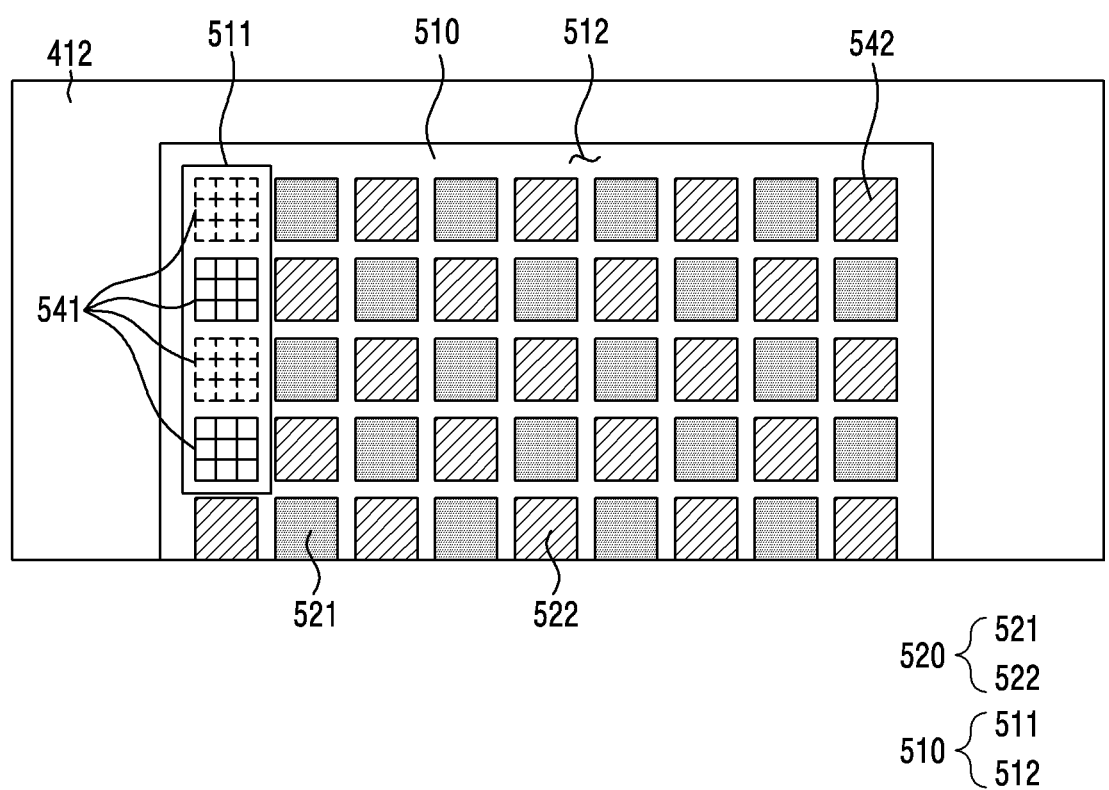
FIG. 5C is a top view of a part of an electronic device according to an embodiment of the disclosure.

FIG. 5A illustrates a part of an electronic device including a touch pad according to an embodiment of the disclosure. FIG. 5B illustrates a cross-sectional view taken along a B axis of FIG. 5A according to an embodiment of the disclosure. FIG. 5C is a top view of a part of an electronic device according to an embodiment of the disclosure.

Referring to FIG. 5A, an electronic device 101 according to an embodiment may include a first housing 411, a second housing 412, a hinge structure 430, a keyboard 440 disposed in the second housing 412, and a cover layer 550 which is included in a touch pad (for example, the touch pad 470 of FIG. 4A) and has at least a part exposed to the outside of the electronic device 101. The same reference numerals may be used for components that are the same or substantially the same as the above-described components, and a redundant explanation is omitted.

In an embodiment, the touch pad 470 may be disposed on one surface of the second housing 412. According to an embodiment, a part of the second housing 412 may be formed as the touch pad 470. According to an embodiment, the touch pad 470 may be formed with a nonconductive material (for example, plastic), but this should not be considered as limiting.

According to another embodiment, the cover layer 550 may include a first touch area 551 and a second touch area 552 which is extended from the first touch area 551. According to an embodiment, the cover layer 550 may include a first touch area 551 which is adjacent to the center of the cover layer 550, and a second touch area 552 which is extended from the first touch area 551 and is adjacent to a periphery of the cover layer 550.

Referring to FIGS. 5A and 5B, an insulation layer 510 and an antenna module 530 according to an embodiment may be disposed under the cover layer 550. According to an embodiment, the insulation layer 510 may be disposed in an area corresponding to the cover layer 550. According to another embodiment, the antenna module 530 may be disposed under the insulation layer 510. According to an embodiment, the antenna module 530 may be disposed in an area corresponding to the second touch area 552 of the cover layer 550 under the insulation layer 510.

According to yet another embodiment, the insulation layer 510 may be formed with a nonconductive material. For example, the insulation layer 510 may be formed with a high molecular material (for example, resin) and/or fiberglass.

According to an embodiment, the antenna module 530 may include a first surface that faces the cover layer 550, and a second surface that faces in the opposite direction of the first surface. In yet another embodiment, the antenna module 530 may include an antenna array (for example, the antenna array 330 of FIGS. 3A, 3B, and 3C) disposed on the first surface.

Referring to FIGS. 5A to 5C, a plurality of pads 520 may be disposed on one surface of the insulation layer 510 that is adjacent to the cover layer 510 according to an embodiment. In an embodiment, the plurality of pads 520 may include a reception pad 521 having a negative voltage and a transmission pad 522 having a positive voltage. According to an embodiment, at least one processor (for example, the processor 120 of FIG. 1) may detect a touch input of a user on the touch pad 470 by detecting a change in the capacitance of the reception pad 521 and the transmission pad 522. According to another embodiment, at least a part of the reception pad 521 and the reception pad 522 may be electrically connected with the ground. According to yet another embodiment, the reception pad 521 and the transmission pad 522 may be disposed alternately on the insulation layer 510. However, arrangements of the reception pad 521 and the transmission pad 522 are not limited to the above-described example.

According to an embodiment, the insulation layer 510 may include a first area 511 corresponding to one surface of the antenna module 530, and a second area 512 other than the first area 511. According to another embodiment, the plurality of pads 541 and 542 may include first pads 541 which are disposed on the first area 511 of the insulation layer 510, and second pads 542 which are disposed on the second area 512 of the insulation layer 510.

According to an embodiment, the first pads 541 and the second pads 542 may have different shapes and/or areas. Each of the first pads 541 may have a first shape in which at least a part of an area overlapping an antenna array disposed in the antenna module 530 is removed. For example, the first shape of the first pads 541 may have a mesh pattern, but this should not be considered as limiting.

Each of the second pads 542 may have a second shape in which an area corresponding to the removed area of the first pads 541 is not removed. According to an embodiment, the second pads 542 may have larger areas than the first pads 541.

A wireless communication circuit (for example, the wireless communication module 192 of FIG. 1) electrically connected with the antenna module 530 may feed power to the antenna module 530 (or the antenna array), thereby transmitting and/or receiving a signal of a designated frequency band (for example, 3.5 GHz). According to one embodiment, the wireless communication circuit may feed power to the antenna array, thereby transmitting and/or receiving a signal of a designated frequency band in a direction toward the first area 511 of the insulation layer 510.

Figure 6A:
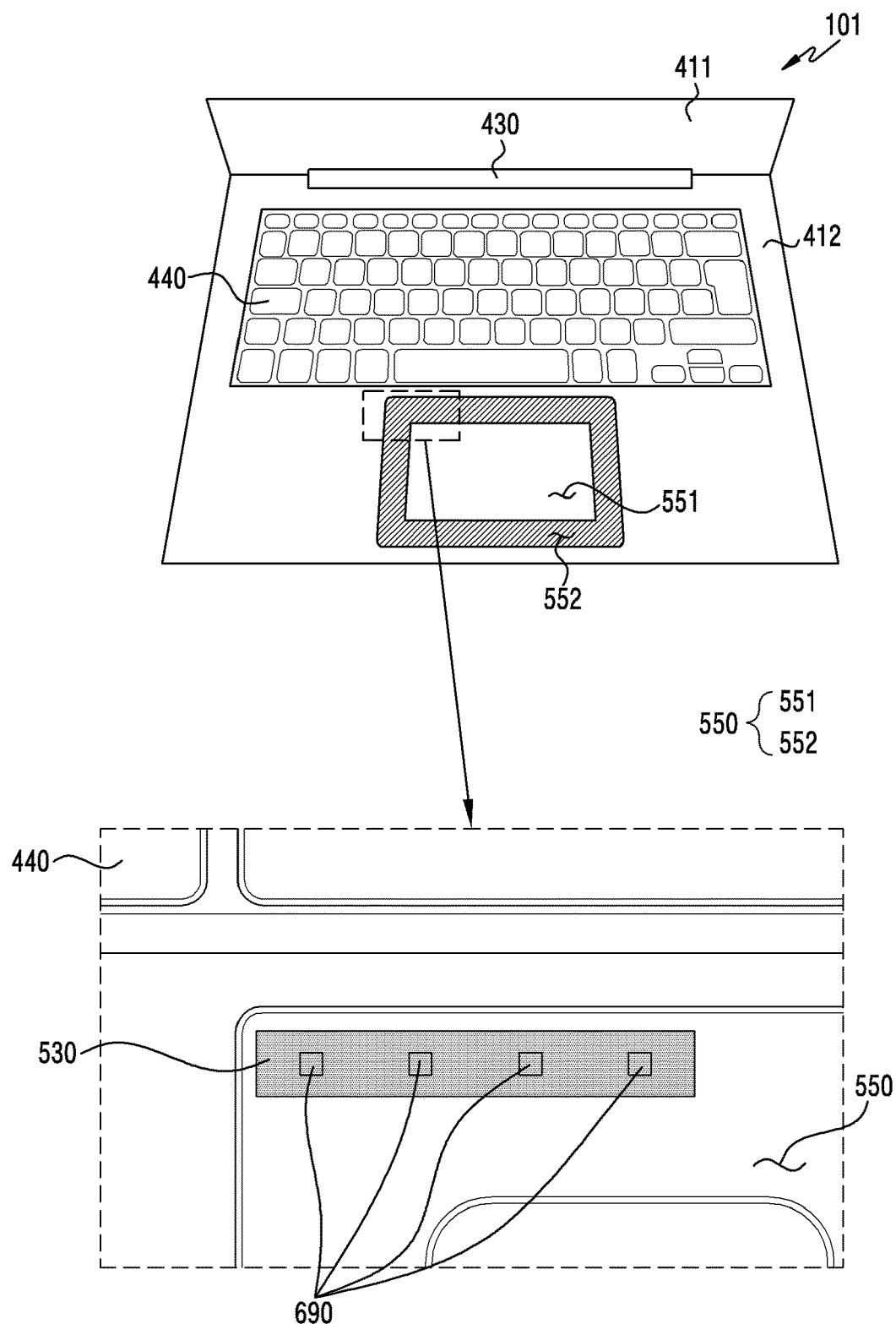
FIG. 6A is a view illustrating a front surface of an electronic device, and an enlarged view thereof according to an embodiment of the disclosure.
Figure 6B:
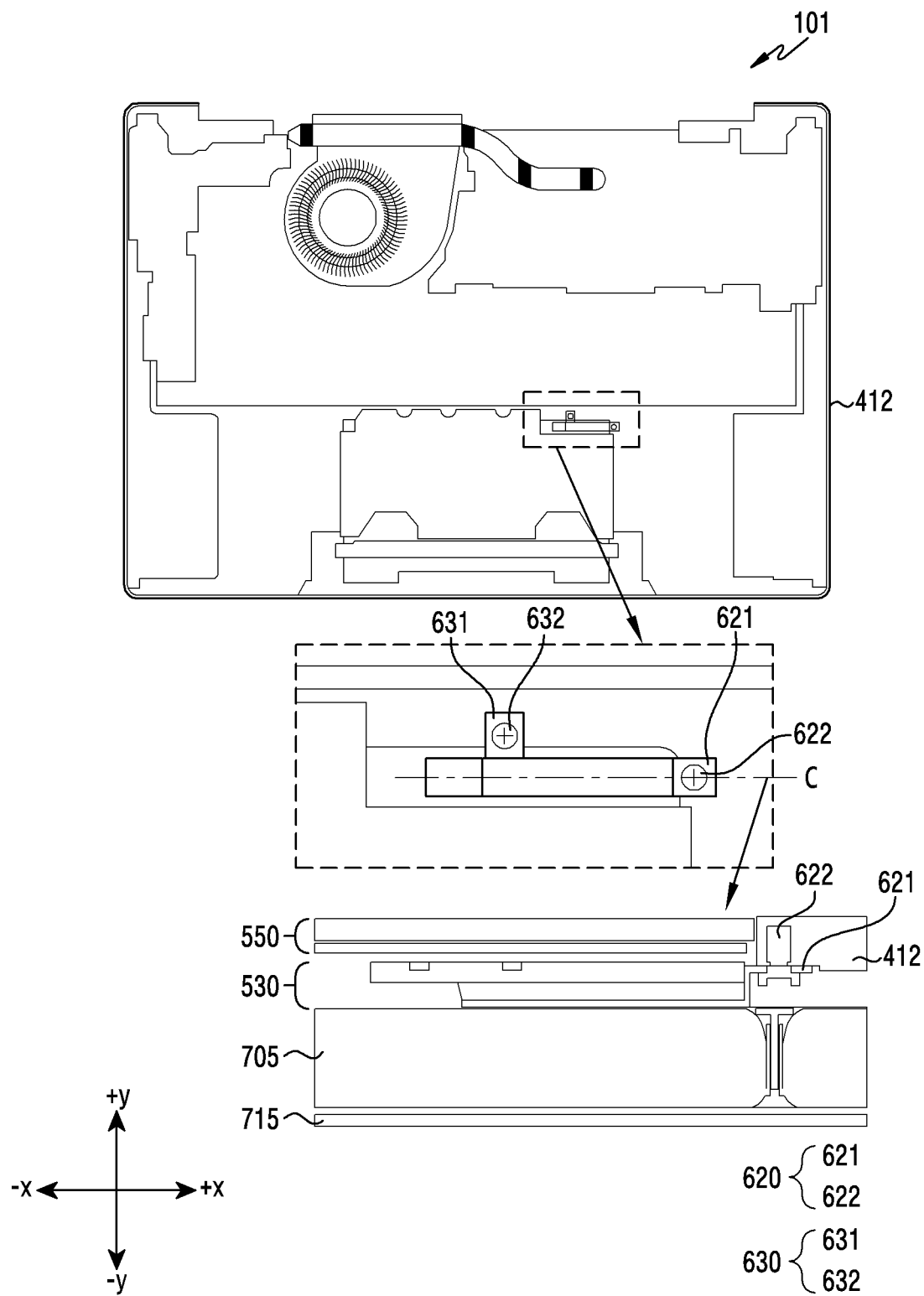
FIG. 6B is a view illustrating an enlarged view of an electronic device including a fixing structure, and a cross-sectional view taken along the C axis according to an embodiment of the disclosure.

FIG. 6A illustrates a front surface of an electronic device according to an embodiment, and an enlarged view thereof according to an embodiment of the disclosure. FIG. 6B illustrates an enlarged view of an electronic device including a fixing structure, and a cross-sectional view taken along the C axis according to an embodiment of the disclosure.

Referring to FIGS. 6A and 6B, an electronic device 101 may include a first housing 411, a second housing 412, a display 420, a hinge structure 430, a keyboard 440, a cover layer 550 which is included a touch pad (for example, the touch pad 470 of FIG. 4A) and has at least a part exposed to the outside of the electronic device 101, and an antenna module 530 disposed under the cover layer 550. According to another embodiment, the electronic device 101 may include a fixing structure 620, 630 to fix the antenna module 530 to the second housing 412. The same reference numerals may be used for the same components as the above-described components, and a redundant explanation is omitted.

Referring to FIG. 6A, the antenna module 530 according to an embodiment may be disposed under the cover layer 550. According to an embodiment, the antenna module 530 may be disposed under the cover layer 550 in an area that is adjacent to a periphery of the cover layer 550. According to another embodiment, the antenna module 530 may be disposed under an area of the cover layer 550 that corresponds to a second touch area 552.

According to an embodiment, the antenna module 530 may be disposed such that an antenna array 690 (for example, the antenna array 330 of FIGS. 3A, 3B, and 3C) disposed on a printed circuit board (PCB) (for example, the printed circuit board 310 of FIGS. 3A, 3B, and 3C) faces the cover layer 550 under the cover layer 550. According to an embodiment, the antenna module 530 may be disposed such that the antenna array 690 faces the cover layer 550 in the area corresponding to the second touch area 552 of the cover layer 550.

Referring to FIG. 6B, the antenna module 530 according to an embodiment may be coupled with at least a part of the second housing 412 through the fixing structure 620, 630. The antenna module 530 may be coupled with at least a part of the second housing 412 through the fixing structure 620, 630, and may be disposed under the cover layer 550 of the touch pad (for example, the touch pad 470 of FIG. 4A).

According to an embodiment, the fixing structure 620, 630 may include a protrusion 621, 621 extending from one end of the antenna module 530, and a coupling member 622, 632 coupled with the protrusion 621, 631. For example, a first fixing structure 620 may include a first protrusion 621 which is extended from one end of the antenna module 530 and includes an opening, and a first coupling member 622 which passes through the opening and fixes the antenna module 530 to the second housing 412. In another example, the first coupling member 622 and a second coupling member 632 may be referred to as a screw, but this should not be considered as limiting.

According to another embodiment (not shown), the fixing structure 620, 630 may include a protrusion having elasticity, and the protrusion may be inserted into a recess formed on a part of the second housing 412. However, the shape of the fixing structure 620, 630 is not limited to the above-described example, and may be referred to as various shapes.

The fixing structure 620, 630 may include a first fixing structure 620 and a second fixing structure 630 which is spaced apart from the first fixing structure 620. According to another embodiment, the first fixing structure 620 may include a first protrusion 621 which is extended from one end of the antenna module 530 in a first direction (for example, a +x direction), and a first coupling member 622 which is coupled with the first protrusion 621 to fix the antenna module 530 to the second housing 412. According to yet another embodiment, the second fixing structure 630 may include a second protrusion 631 which is extended from one end of the antenna module 530 in a second direction (for example, a +y direction) substantially perpendicular to the first direction, and a second coupling member 632 which is coupled with the second protrusion 631 to fix the antenna module 530 to the second housing 412. However, the direction and position in which the fixing structure 620 is formed are not limited to the above-described example, and the fixing structure 620 may be formed in various directions and positions.

According to an embodiment, the antenna module 530 may be disposed between the cover layer 550 and a battery 705. According to another embodiment, the battery 705 may be disposed over a rear surface cover 715, and the antenna module 530 may be disposed over the battery 705.

Figure 7A:
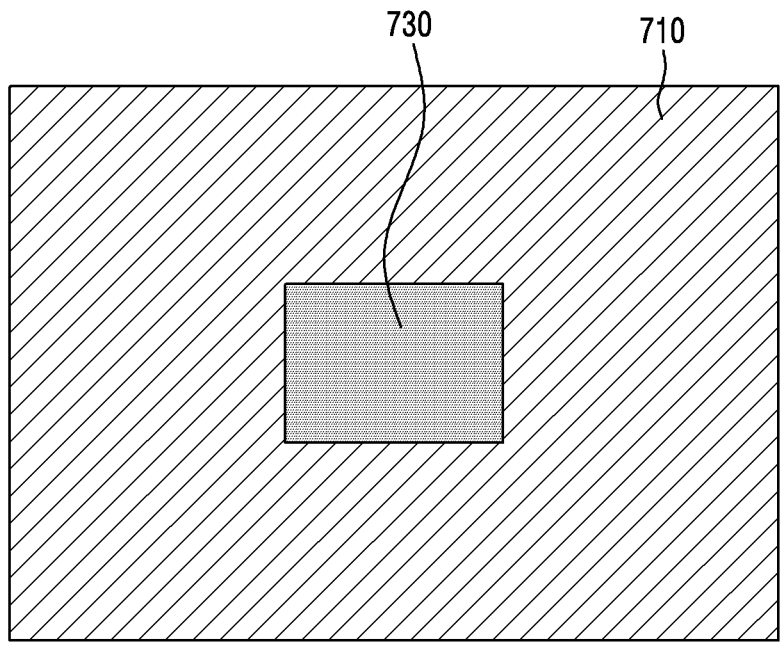
FIG. 7A is a view illustrating a part of an antenna array according to an embodiment of the disclosure.
Figure 7B:
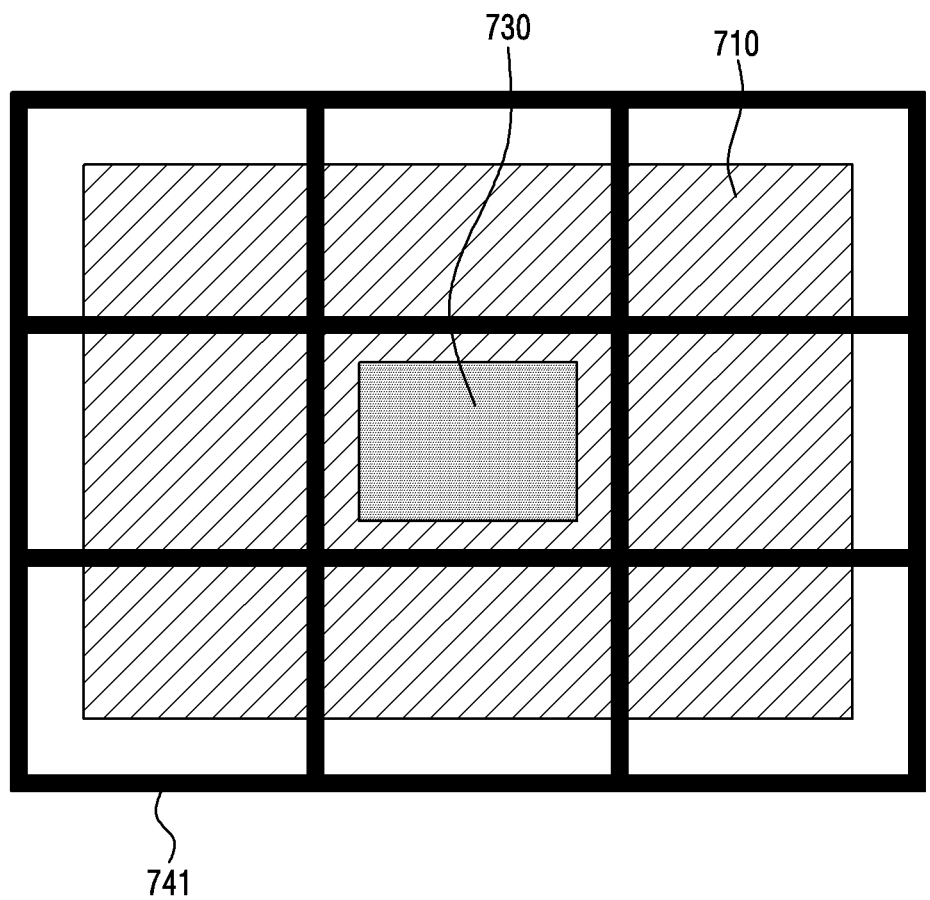
FIG. 7B is a view illustrating a structure in which a part of an antenna module overlaps at least a part of a transmission pad according to an embodiment of the disclosure.
Figure 7C:
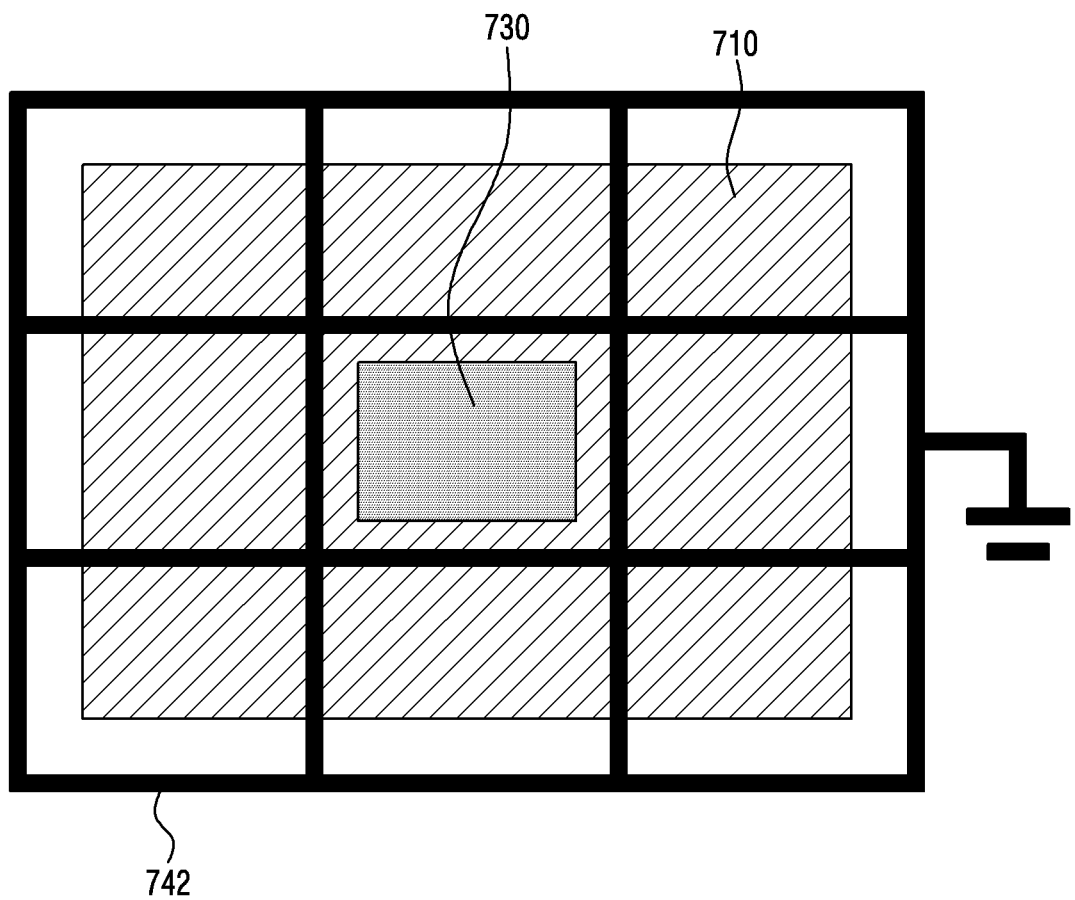
FIG. 7C is a view illustrating a structure in which a part of an antenna module overlaps at least a part of a reception pad according to an embodiment of the disclosure.

FIG. 7A illustrates a part of an antenna array according to an embodiment of the disclosure. FIG. 7B illustrates a structure in which a part of the antenna module overlaps at least a part of a transmission pad according to an embodiment of the disclosure. FIG. 7C illustrates a structure in which a part of the antenna module overlaps at least a part of a reception pad according to an embodiment of the disclosure.

Referring to FIGS. 7A and 7B, a printed circuit board 710 (for example, a printed circuit board 310 of FIGS. 3A, 3B, and 3C) according to an embodiment may include an antenna array 730 disposed on one surface thereof. The antenna array 730 according to an embodiment may be referred to as at least a part of the antenna array 330 of FIGS. 3A, 3B, and 3C. According to an embodiment, a wireless communication circuit (for example, the wireless communication module 192 of FIG. 1) electrically connected with the printed circuit board 710 may feed power to the antenna array 730, thereby transmitting and/or receiving a signal of a designated frequency band (for example, 3.5 GHz).

According to an embodiment, a reception pad 741 and/or a transmission pad 742 may be disposed such that at least some areas overlap the printed circuit board 710. According to an embodiment, the reception pad 741 and/or the transmission pad 742 may be disposed such that at least some areas overlap the antenna array 730.

The reception pad 741 and/or transmission pad 742 may have a shape in which at least a part of an area overlapping the antenna array 730 is removed. For example, the reception pad 741 and/or transmission pad 742 may have a mesh pattern. In another example, the reception pad 741 and/or transmission pad 742 may have a shape in which some areas of the mesh pattern are filled, but the shape of the reception pad 741 and the transmission pad 742 is not limited to the above-described example and may be referred to as various shapes.

According to one embodiment, at least one of the reception pad 741 and the transmission pad 742 may be electrically connected with the ground.

Figure 8A:
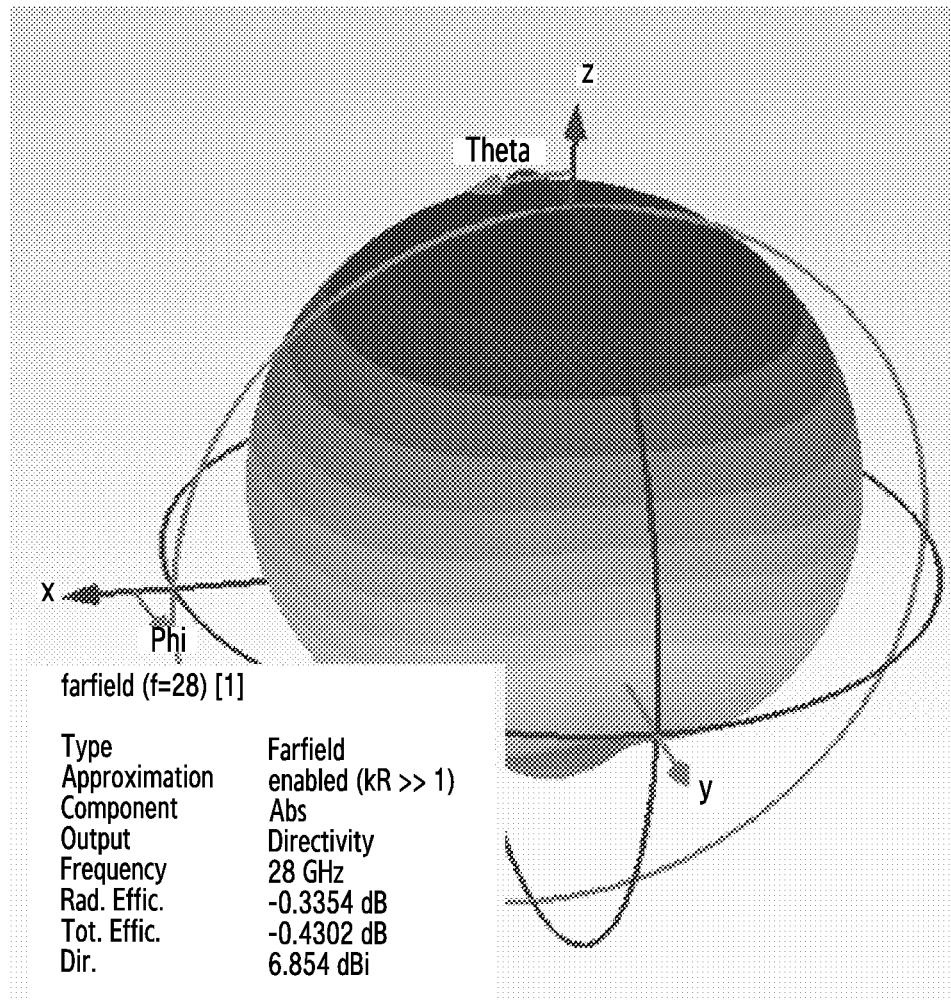
FIG. 8A is a view illustrating radiation performance of an antenna module achieved through the structure of FIG. 7A according to an embodiment of the disclosure.
Figure 8B:
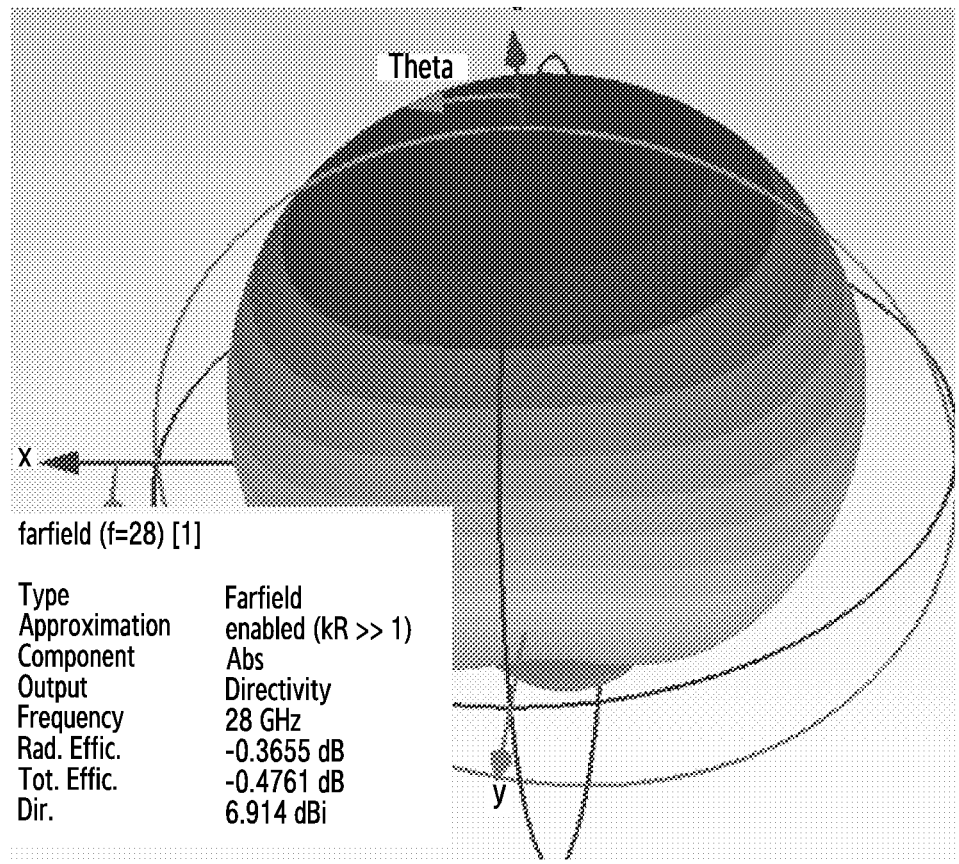
FIG. 8B is a view illustrating radiation performance of an antenna module achieved through the structure of FIG. 7B according to an embodiment of the disclosure.
Figure 8C:
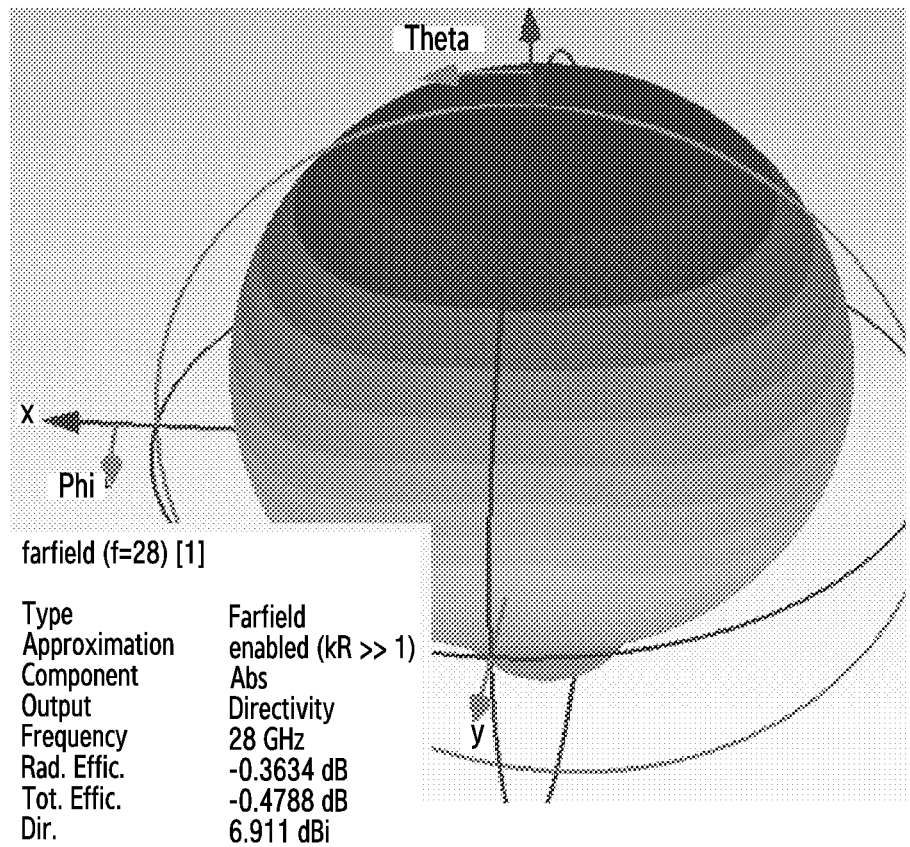
FIG. 8C is a view illustrating radiation performance of an antenna module achieved through the structure of FIG. 7C according to an embodiment of the disclosure.

FIG. 8A illustrates radiation performance of an antenna module achieved through the structure of FIG. 7A according to an embodiment of the disclosure. FIG. 8B illustrates radiation performance of an antenna module achieved through the structure of FIG. 7B according to an embodiment of the disclosure. FIG. 8C illustrates radiation performance of an antenna module achieved by the structure of FIG. 7C according to an embodiment of the disclosure.

Referring to FIGS. 7A and 8A, radiation performance of a radio frequency (RF) signal when a printed circuit board 710 and an antenna array 730 according to an embodiment does not overlap a reception pad 741 or a transmission pad 742 may be identified.

Referring to FIGS. 7B, 7C, 8B, and 8C, radiation performance of a RF signal achieved through the antenna array 730 when at least a part of the printed circuit board 710 according to an embodiment overlaps the reception pad 741 or the transmission pad 742 may be identified.

According to an embodiment, radiation performance of a signal achieved through the antenna array 730 when at least a part of the printed circuit board 710 overlaps the reception pad 741 or the transmission pad 742 may be similar to or substantially the same as radiation performance of a signal achieved through the antenna array 730 when at least a part of the printed circuit board 710 does not overlap the reception pad 741 or the transmission pad 742.

In an embodiment, radiation performance of a RF signal achieved when at least a part of the printed circuit board 710 and the antenna array 730 overlaps the reception pad 741 or the transmission pad 742 may not be degraded compared to radiation performance of a RF signal achieved when at least a part of the printed circuit board 710 and the antenna array 730 does not overlap the reception pad 741 or the transmission pad 742.

Figure 9:
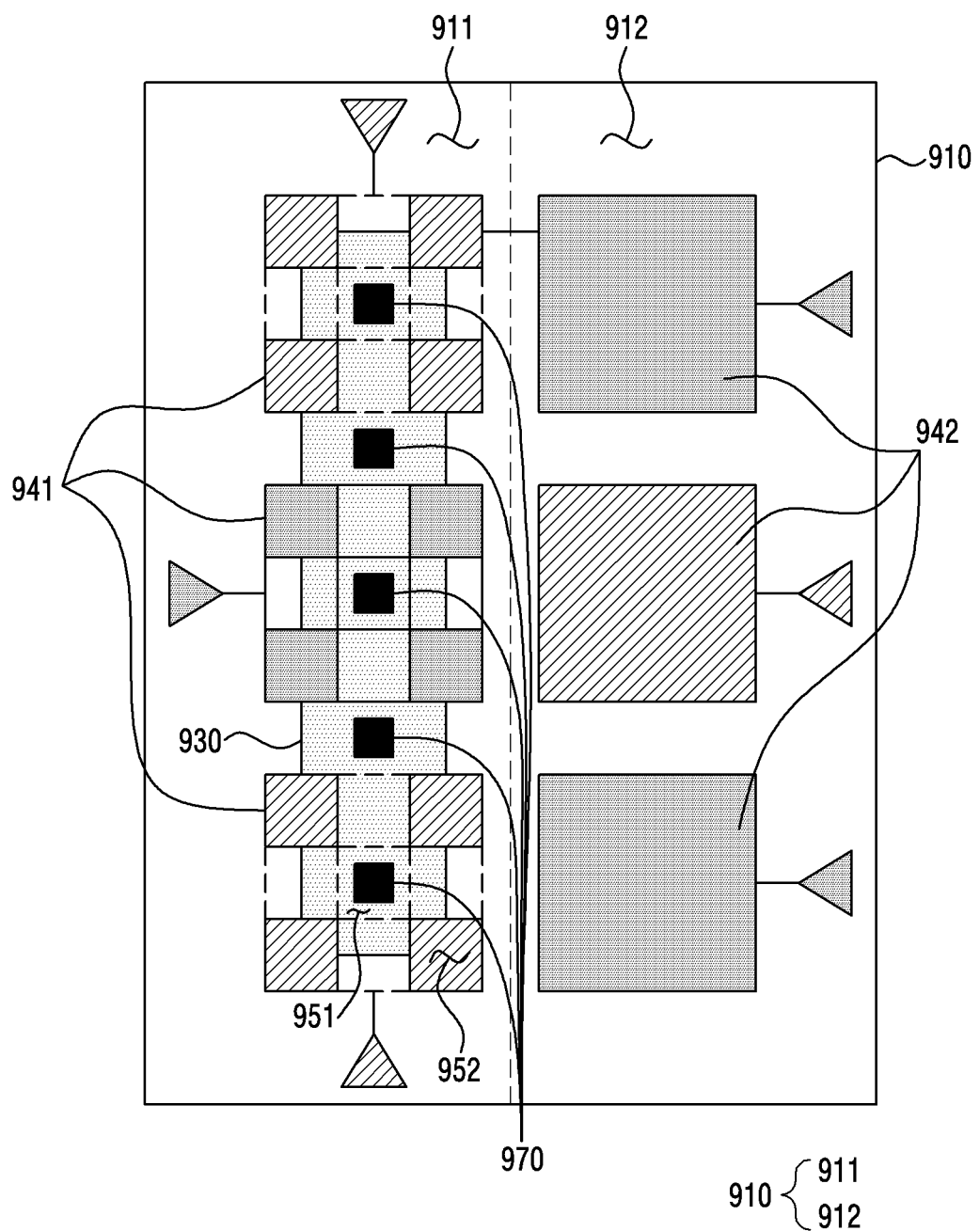
FIG. 9 is a top view of a touch pad according to an embodiment of the disclosure.

FIG. 9 is a top view of a touch pad according to an embodiment of the disclosure.

Referring to FIG. 9, a plurality of pads 941, 942 according to another embodiment may have various shapes according to an area of an insulation layer 910, and may be disposed on the insulation layer 910. According to an embodiment, at least one of a plurality of pads 941, 942 may be electrically connected with the ground. The insulation layer 910 and the plurality of pads 941, 942 according to an embodiment may be referred to as the insulation layer 510 and the plurality of pads 541, 542 of FIG. 5C, respectively. An explanation of the same components as the above-described components is omitted.

In an embodiment, the insulation layer 910 may include a first area 911 corresponding to an area where an antenna module 930 is disposed, and a second area 912 other than the first area 911. The first area 911 and the second area 912 of the insulation layer 910 according to an embodiment may be referred to as the first area 511 and the second area 512 of the insulation layer 510 of FIG. 5C, respectively.

According to an embodiment, the plurality of pads 941, 942 disposed on one surface of the insulation layer 910 may include first pads 941 disposed in the first area 911 and second pads 942 disposed in the second area 912. According to another embodiment, the plurality of pads 941, 942 may include the first pads 941 which are disposed in the first area 911 of the insulation layer 910 that corresponds to one surface of the antenna module 930 (for example, the antenna module 530 of FIG. 5B), and the second pads 942 which are disposed in the second area 912 other than the first area 911.

In an embodiment, each of the first pads 941 may have a first shape in which a removal area 951 overlapping an antenna array 970 (for example, the antenna array 730 of FIG. 7A) is removed. According to another embodiment, each of the first pads 941 may have the first shape in which the removal area 951 overlapping the antenna array 970 is removed and a non-removal area 952 not overlapping the antenna array 970 is not removed. The first shape according to an embodiment may have a high touch sensitivity compared to a mesh pattern.

Each of the second pads 942 may have a second shape in which an area corresponding to the removal area 951 of the first pads 941 is not removed. According to another embodiment, the second pads 942 may have large areas compared to the first pads 941.

According to an embodiment, an electronic device 101 may include: a housing which forms at least a part of an exterior of the electronic device 101; an antenna module 530 which is disposed in the housing and includes a first surface facing one surface of the housing and a second surface facing in the opposite direction of the first surface, the antenna module 530 including an antenna array 330 disposed on the first surface; a wireless communication circuit electrically connected with the antenna module 530; an insulation layer 510 which is disposed between the first surface of the antenna module 530 and one surface of the housing; and first pads 541 which are disposed in a first area of the insulation layer 510 that corresponds to the first surface of the antenna module 530, and each of the first pads 541 may have a first shape in which at least a part of an area overlapping the antenna array 330 is removed, and the wireless communication circuit may feed power to the antenna array 330, thereby transmitting and/or receiving a signal of a designated frequency band.

The electronic device 101 may include second pads 542 which are disposed in a second area of the insulation layer 510 other than the first area.

According to an embodiment, the first pads 541 and the second pads 542 may include a transmission pad 522 having a positive voltage and a reception pad 521 having a negative voltage.

According to another embodiment, the electronic device 101 may include at least one processor electrically connected with the transmission pad 522 and the reception pad 521, and the at least one processor may detect a touch input by detecting a change in a capacitance of the transmission pad 522 and the reception pad 521.

According to an embodiment, the transmission pad 522 and the reception pad 521 may be alternately arranged on the insulation layer 510.

According to yet another embodiment, at least a part of the first pads 541 and the second pads 542 may be electrically connected with the ground.

According to an embodiment, the housing may include a cover layer 550 formed in an area corresponding to the insulation layer 510, and the cover layer 510 may be formed with a nonconductive material.

According to still another embodiment, the antenna module 530 may be disposed such that the first surface faces an area of the cover layer 550 that is adjacent to a periphery of the cover layer 550.

According to an embodiment, the first shape may include a mesh pattern.

In an embodiment, each of the second pads 542 has a second shape in which an area corresponding to the removed area of the first pads 541 is not removed.

According to an embodiment, the electronic device 101 may include a display, and the housing may include a first housing which is coupled with the display, and a second housing which is coupled with the first housing through a hinge structure, and the housing may be switchable to a folding state or unfolding state with reference to the hinge structure.

In another embodiment, in the unfolding state, the wireless communication circuit may feed power to the antenna module, thereby transmitting and receiving the signal of the designated frequency band.

According to an embodiment, the designated frequency band may include a 35 GHz frequency band.

In yet another embodiment, the electronic device 101 may further include a fixing structure coupled with at least a part of the antenna module, and the antenna module 530 may be coupled with the housing and/or the insulation layer 510 through the fixing structure.

According to an embodiment, the fixing structure may include a protrusion which is extended from the antenna module 530, and a coupling member which is coupled with the protrusion to fix the antenna module 530 to the housing.

According to one embodiment, an electronic device 101 may include: a display; a housing including a first housing coupled with the display, and a second housing coupled to be rotatable relative to the first housing through the hinge structure and including a cover layer 550; an antenna module 530 which is disposed in the second housing and includes a first surface facing the cover layer 550 and a second surface facing in the opposite direction of the first surface, the antenna module 530 including an antenna array 330 disposed on the first surface; a wireless communication circuit electrically connected with the antenna module 530; an insulation layer 510 which is disposed between the first surface of the antenna module 530 and the cover layer 550; and first pads 541 which are disposed in a first area of the insulation layer 510 that corresponds to the first surface of the antenna module 530, and each of the first pads 541 may have a first shape in which at least a part of an area overlapping the antenna array 330 is removed, and the wireless communication circuit may feed power to the antenna array 330, thereby transmitting and/or receiving a signal of a designated frequency band.

According to another embodiment, the electronic device 101 may include second pads 542 which are disposed in a second area other than the first area of the insulation layer 510, and each of the second pads 542 may have a second shape that has a larger area than the first pads 541.

According to an embodiment, the electronic device 101 may include at least one processor electrically connected with the first pads 541 and the second pads 542, and the at least one processor may detect a touch input by detecting a change in a capacitance of the first pads 541 and the second pads 542.

The cover layer 550 may be formed with a nonconductive material, and the antenna module 530 may be disposed such that the first surface faces an area of the cover layer 550 that is adjacent to a periphery of the cover layer 550.

According to an embodiment, the electronic device 101 may further include a fixing structure coupled with at least a part of the antenna module 530, and the antenna module 530 may be coupled with the housing and/or the insulation layer 510 through the fixing structure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing;
    an antenna module which is disposed in the housing and comprises a first surface facing one side of the housing and a second surface facing in the opposite direction of the first surface, the antenna module comprising an antenna array disposed on the first surface;
    a wireless communication circuit electrically connected with the antenna module;
    an insulation layer which is disposed between the first surface of the antenna module and one surface of the housing; and
    first pads which are disposed in a first area of the insulation layer that corresponds to the first surface of the antenna module,
    wherein each of the first pads has a first shape in which at least a part of an area overlapping the antenna array is removed, and
    wherein the wireless communication circuit feeds power to the antenna array, thereby transmitting and/or receiving a signal of a designated frequency band.

2. The electronic device of claim 1, wherein the electronic device comprises second pads which are disposed in a second area of the insulation layer other than the first area.

3. The electronic device of claim 2, wherein the first pads and the second pads comprise a transmission pad having a positive voltage and a reception pad having a negative voltage.

4. The electronic device of claim 3,
    wherein the electronic device comprises:
    memory storing instructions,
    processor, and
    wherein the instructions that, when executed by processor, cause the electronic device to:
    detect a touch input by detecting a change in a capacitance of the transmission pad and the reception pad.

5. The electronic device of claim 3, wherein the transmission pad and the reception pad are alternately arranged on the insulation layer.

6. The electronic device of claim 2, wherein at least a part of the first pads and the second pads is electrically connected with a ground.

7. The electronic device of claim 1, wherein the housing comprises a cover layer formed in an area corresponding to the insulation layer, and the cover layer is formed with a nonconductive material.

8. The electronic device of claim 7, wherein the antenna module is disposed such that the first surface faces an area of the cover layer that is adjacent to a periphery of the cover layer.

9. The electronic device of claim 1, wherein the first shape comprises a mesh pattern.

10. The electronic device of claim 2, wherein each of the second pads has a second shape in which an area corresponding to the removed area of the first pads is not removed.

11. The electronic device of claim 1,
    wherein the electronic device comprises a display, and
    wherein the housing comprises a first housing which is coupled with the display, and a second housing which is coupled with the first housing through a hinge structure, and the housing is switchable to a folding state or unfolding state with reference to the hinge structure.

12. The electronic device of claim 11, wherein, in the unfolding state, the wireless communication circuit feeds power to the antenna module, thereby transmitting and receiving the signal of the designated frequency band.

13. The electronic device of claim 1, wherein the designated frequency band comprises a 35 GHz frequency band.

14. The electronic device of claim 1,
    wherein the electronic device further comprises a fixing structure coupled with at least a part of the antenna module, and wherein the antenna module is coupled with the housing and/or the insulation layer through the fixing structure.

15. The electronic device of claim 14, wherein the fixing structure comprises a protrusion which is extended from the antenna module, and a coupling member which is coupled with the protrusion to fix the antenna module to the housing.

16. An electronic device comprising:
   a display;
   a housing including a first housing coupled with the display, and a second housing coupled to be rotatable relative to the first housing through a hinge structure and comprising a cover layer;
   an antenna module which is disposed in the second housing and includes a first surface facing the cover layer and a second surface facing in the opposite direction of the first surface, the antenna module comprising an antenna array disposed on the first surface;
   a wireless communication circuit electrically connected with the antenna module;
   an insulation layer which is disposed between the first surface of the antenna module and the cover layer; and
   first pads which are disposed in a first area of the insulation layer that corresponds to the first surface of the antenna module, and each of the first pads has a first shape in which at least a part of an area overlapping the antenna array is removed, and wherein the wireless communication circuit feed power to the antenna array, thereby transmitting and/or receiving a signal of a designated frequency band.

17. The electronic device of claim 16, wherein the electronic device comprises second pads which are disposed in a second area other than the first area of the insulation layer, and each of the second pads have a second shape that has a larger area than the first pads.

18. The electronic device of claim 17, wherein the electronic device comprises at least one processor electrically connected with the first pads and the second pads, and the at least one processor detect a touch input by detecting a change in a capacitance of the first pads and the second pads.

19. The electronic device of claim 16, wherein the cover layer be formed with a nonconductive material, and the antenna module be disposed such that the first surface faces an area of the cover layer that is adjacent to a periphery of the cover layer.

20. The electronic device of claim 16, the electronic device further comprises a fixing structure coupled with at least a part of the antenna module, and the antenna module be coupled with the housing and/or the insulation layer through the fixing structure.

* * * * *